D. M. CRYDER.
WIND SHIELD CLEANER.
APPLICATION FILED DEC. 20, 1917.

1,300,349.

Patented Apr. 15, 1919.

Inventor
D. M. CRYDER
By N. S. Hill
Attorney

UNITED STATES PATENT OFFICE.

DEWEY M. CRYDER, OF ADELPHIA, OHIO.

WIND-SHIELD CLEANER.

1,300,349. Specification of Letters Patent. Patented Apr. 15, 1919.

Application filed December 20, 1917. Serial No. 208,002.

*To all whom it may concern:*

Be it known that I, DEWEY M. CRYDER, a citizen of the United States, residing at Adelphia, in the county of Ross, State of Ohio, have invented a new and useful Wind-Shield Cleaner; and I do hereby declare the following to be a full, clear, and exact description of the invention, such as will enable others skilled in the art to which it appertains to make and use the same.

The present invention relates to a wind shield cleaner, and has for its object to provide a device of this character which embodies novel features of construction whereby the glass wind shield of a vehicle can be kept clear of accumulations of snow, ice and water, thereby enabling the driver to obtain a clear vision of the road ahead when out in stormy weather.

Further objects of the invention are to provide a device of this character which can be readily mounted upon any conventional wind shield, which can be easily and quickly manipulated by the driver of the vehicle, and which will remove a thin film of ice or snow as readily as loose drops of water, leaving the glass with a substantially dry surface so that a clear vision can be obtained.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
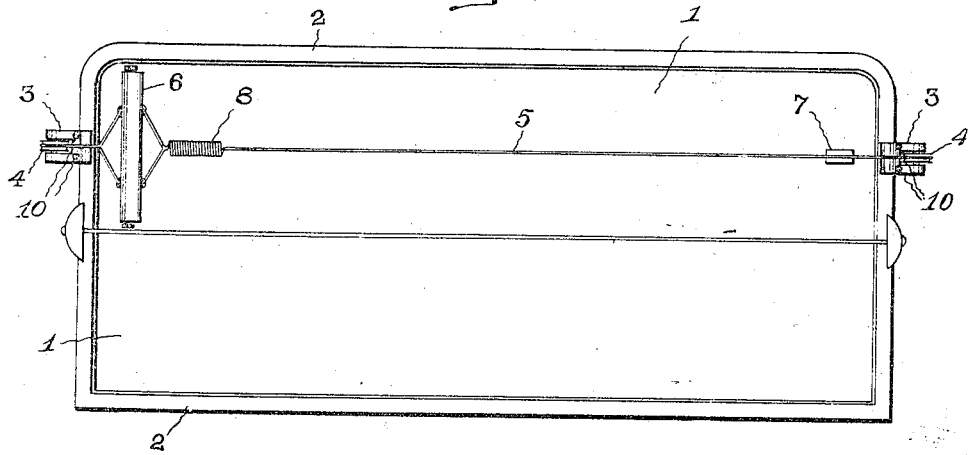
Figure 1 is a front elevation of a wind shield provided with a cleaning device constructed in accordance with the invention.
Figure 2:
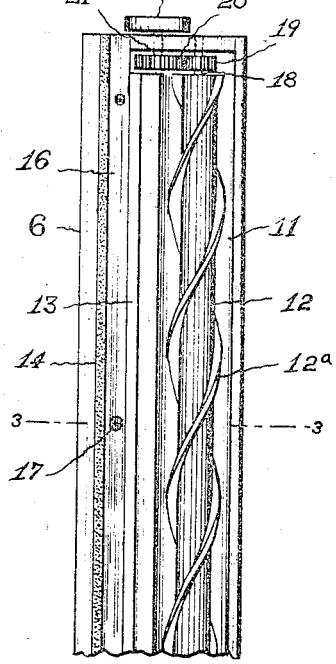
Fig. 2 is an enlarged view of the rear face of one end of the cleaning bar.
Figures 3, 6:
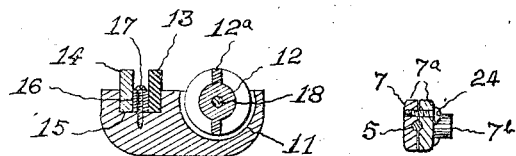
Fig. 3 is a transverse sectional view through the same on the line 3—3 of Fig. 2.
Fig. 6 is an enlarged tranverse sectional view through the finger piece.
Figure 5:
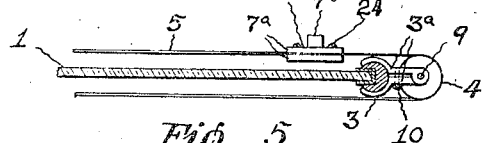
Fig. 5 is a horizontal sectional view through one end of the wind shield, showing one of the pulley mountings and the finger piece.
Figure 4:
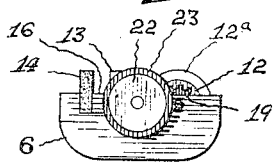
Fig. 4 is an end view of the cleaning bar.

For the purpose of illustration the invention is shown as applied to a conventional wind shield, in which the transparent glass plates 1 are mounted within the frames 2. The upper frame 2 has pulley brackets 3 applied to the ends thereof, said brackets carrying the grooved pulleys 4 around which a fine wire 5 is carried, said wire extending across both the front and the back of the wind shield and being provided at the front of the wind shield with a vertical cleaning bar 6 and at the back of the wind shield with a finger piece 7. The cleaning bar 6 is normally permitted to remain in an out of the way position at one end of the wind shield, although it will be obviout that by grasping the finger piece 7 and moving it back and forth across the rear of the wind shield, the cleaning bar will be given a corresponding movement across the front of the wind shield, with the result that any accumulations of snow or water which may have collected upon the front of the wind shield will be removed. The extremities of the wire 5 are shown as connected to opposite sides of the cleaning bar 6 by diverging branches 5ª so that the cleaning bar will be maintained in an upright position, and a spring 8 is interposed in the length of the wire for the purpose of taking up any slack therein and holding the wire under the proper degree of tension at all times.

The pulley brackets 3 each include a pair of complemental jaws 3ª which are adapted to engage the frame 2 of the wind shield, the outer edge of the jaws being pivoted upon a pintle 9 and being notched to receive the pulley 4 which is also mounted upon the said pintle 9. Screws 10 are provided for drawing the jaws 3ª toward each other and causing them to tightly grip the frame of the wind shield after the bracket has been properly positioned thereon. These brackets can be readily applied as an attachment to any wind shield, without necessitating any changes in the construction thereof, or requiring any special tools.

The cleaning bar has a curved outer face or back, the inner face thereof being provided at one side with a longitudinal depression 11 within which a scraping roller 12 is mounted, and at the opposite side thereof with spaced longitudinally extending rubber and felt strips 13 and 14, respectively. For convenience these strips 13 and 14 are shown as clamped in position against opposite sides of a longitudinal groove 15, by means of a retaining strip 16 which is secured by suitable fastening members such as the screws 17. The scraping roller 12 is formed with helical ribs 12ª of metal or like material, the sharp edges of which are adapted to sweep over the surface of the glass and have a scraping action which will positively loosen any accumulations of ice or snow upon the glass. Following the scraping roller 12 is the rubber strip 13 which will serve to wipe loose particles of ice or snow as well as drop of water from the surface of the glass. The felt strip 14 follows the rubber strip and serves to absorb any slight moisture which may still remain upon the glass, thereby leaving the glass with a clean surface so that a clear vision can be obtained through the same.

The scraping roller 12 may be mounted in any suitable manner, although in the present instance it is shown as carried by a shaft 18, the ends of the shaft being provided with pinions 19 which mesh with gear wheels 20 on counter-shafts 21, said counter-shafts projecting from the ends of the cleaning bar where they are provided with rollers 22. These rollers are preferably provided with rubber tires 23 so that they will frictionally engage the surface of the wind shield and operate the scraping roller as the cleaning bar is advanced across the face of the wind shield. The scraping roller is thus given a comparatively rapid rotation which will enable the helical ribs 12ª thereof to operate in a most effective manner upon any accumulations of ice or snow.

The finger piece 7 may be of any suitable construction, being shown in the present instance as formed in complemental clamping members 7ª which are applied to opposite sides of the wire 5 and caused to grip the same by clamping screws 24. A knob 7ᵇ at the back of the finger piece enables it to be easily grasped by the fingers for the purpose of manipulating the finger piece to move the cleaning bar back and forth across the face of the wind shield.

Having thus described the invention, what I claim as new and desire to secure by Letters Patent, is:—

1. A wind shield cleaner including detachable clamps adapted to be mounted on the ends of the wind shield, each clamp including complemental jaws connected by a pivot pin and the pivot ends of the jaws being bifurcated, pulleys arranged within the bifurcated ends of the jaws and mounted upon the pivot pins, a flexible wire adapted to be extended around the front and back of the wind shield and engaging the pulleys, and a cleaning bar carried by the wire and engaging the front of the wind shield, said cleaning bar being movable across the wind shield by manipulating the wire.

2. A wind shield cleaner including a cleaning bar, a roller mounted upon the cleaning bar and provided with a helical scraping rib, means for actuating the roller as the bar is moved across the wind shield, and means for moving the bar.

3. A wind shield cleaner including a cleaning bar, a cleaning roller journaled upon the cleaning bar and provided with a scraping rib, a strip projecting from the bar at one side of the cleaning roller, means for moving the bar across the wind shield with the cleaning roller and strip in engagement therewith, and means for rotating the roller as the bar is moved.

4. A wind shield cleaner including a cleaning bar, a scraping roller journaled upon the cleaning bar and provided with a helical scraping rib, a rubber strip projecting from the bar, a spaced felt strip projecting from the bar, the rubber strip and felt strip having a substantially parallel relation to each other and to the scraping roller, and means for moving the bar across a wind shield.

5. A wind shield cleaner including a cleaning bar, a roller journaled upon the bar and provided with a helical scraping rib, operating wheels geared to the roller, a rubber strip projecting from the bar, a felt strip also projecting from the bar, the rubber strip and felt strip having a substantially parallel relation to each other and to the roller, and means for moving the bar across a wind shield.

6. A wind shield cleaner including detachable clamps adapted to be mounted on the ends of the wind shield, pulleys journaled on the clamps, a flexible wire adapted to be extended around the wind shield and engaging the pulleys, a cleaning bar carried by the wire and adapted to be moved across the wind shield by manipulating the wire, a rotary scraping element carried by the cleaning bar, operating wheels frictionally engaging the wind shield and geared to the rotary scraping element, and a strip projecting from the cleaning bar in a parallel relation to the rotary scraping element, the rotary scraping element and strip both engaging the wind shield.

In testimony whereof I have signed my name to this specification in the presence of two subscribing witnesses.

DEWEY M. CRYDER.

Witnesses:
 GEO. ROSE,
 R. H. BOWSHER.